(12) United States Patent
Opitsch (10) Patent No.: US 12,539,965 B2
(45) Date of Patent: Feb. 3, 2026

(54) SUPPLY SYSTEM FOR A VEHICLE CONNECTED TO A PLATFORM

(71) Applicant: AGCO International GmbH, Neuhausen (CH)

(72) Inventor: Bernd Opitsch, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 411 days.

(21) Appl. No.: 18/185,129

(22) Filed: Mar. 16, 2023

(65) Prior Publication Data

US 2023/0331409 A1    Oct. 19, 2023

(30) Foreign Application Priority Data

Apr. 13, 2022 (GB) .................................... 2205518

(51) Int. Cl.
| | |
|---|---|
| *B64C 39/02* | (2023.01) |
| *B64B 1/50* | (2006.01) |
| *B64F 1/08* | (2006.01) |
| *B64U 10/14* | (2023.01) |
| *B64U 10/60* | (2023.01) |
| *B64U 80/86* | (2023.01) |
| *A01C 23/04* | (2006.01) |
| *A01M 7/00* | (2006.01) |

(52) U.S. Cl.
CPC .............. *B64C 39/022* (2013.01); *B64B 1/50* (2013.01); *B64F 1/08* (2013.01); *B64U 10/14* (2023.01); *B64U 10/60* (2023.01); *B64U 80/86* (2023.01); *A01C 23/047* (2013.01); *A01M 7/0042* (2013.01); *B66D 2700/0125* (2013.01)

(58) Field of Classification Search
CPC ........... B64C 39/022; B64B 1/50; B64F 1/08; B64U 10/14; B64U 10/60; B64U 80/86; B64U 2101/40; B64U 2101/45; B64U 10/30; B64U 70/93; A01C 23/047; A01M 7/0042; B66D 2700/0125
See application file for complete search history.

(56) References Cited

U.S. PATENT DOCUMENTS 2,954,932 A * 10/1960 Alphonso ................. B05B 3/18
                                                          239/722
3,216,466 A * 11/1965 Simko ...................... B64B 1/62
                                                          285/104

(Continued)

FOREIGN PATENT DOCUMENTS

| DE | 102016202627 A1 | 8/2017 |
|---|---|---|
| GB | 266005 A | 8/1927 |
| WO | 2020016942 A1 | 1/2020 |

OTHER PUBLICATIONS

UK Intellectual Property Office, Search report for related UK Application No. GB2205518.0, dated Oct. 4, 2022, 5 pages.

(Continued)

*Primary Examiner* — Medhat Badawi (57) ABSTRACT

A supply system for connecting a first vehicle has a platform, a first vehicle, a bendable connection element with one end connected with the first vehicle and another end connected with the platform and at least one floating unit for lifting the bendable connection element at least partly over a minimum floating height. The at least one floating unit is attachable to the bendable connection element distant from the first vehicle.

17 Claims, 8 Drawing Sheets

(56) References Cited

U.S. PATENT DOCUMENTS

| | | | | |
|---|---|---|---|---|
| 3,700,172 | A * | 10/1972 | Gallegos, Sr. | A63H 27/06 239/722 |
| 3,759,330 | A * | 9/1973 | Rainey | B64D 1/16 169/53 |
| 8,678,309 | B2 * | 3/2014 | Heppe | B64B 1/58 244/30 |
| 9,045,218 | B2 * | 6/2015 | Childress | B60L 9/00 |
| 9,387,928 | B1 * | 7/2016 | Gentry | B64U 50/39 |
| 9,852,644 | B2 * | 12/2017 | Salnikov | G05D 1/104 |
| 10,095,235 | B2 | 10/2018 | Sugumaran et al. | |
| 11,040,773 | B2 * | 6/2021 | Furukawa | B64U 10/60 |
| 11,235,890 | B1 * | 2/2022 | Dahlstrom | B05B 13/005 |
| 11,460,866 | B2 * | 10/2022 | Amsili | G05D 1/104 |
| 11,679,873 | B2 * | 6/2023 | Suefuku | B08B 3/024 244/4 R |
| 11,820,533 | B2 * | 11/2023 | Ratajczak | B64F 1/32 |
| 12,239,863 | B2 * | 3/2025 | Suefuku | B08B 3/024 |
| 2010/0013226 | A1 * | 1/2010 | Blumer | F03D 5/00 290/55 |
| 2013/0134254 | A1 * | 5/2013 | Moore | B64U 10/60 244/17.11 |
| 2013/0297083 | A1 * | 11/2013 | Pfrenger | A01G 25/092 700/284 |
| 2016/0144958 | A1 | 5/2016 | Woodworth et al. | |
| 2016/0307448 | A1 * | 10/2016 | Salnikov | A01C 21/00 |
| 2016/0318607 | A1 | 11/2016 | Desai et al. | |
| 2017/0043872 | A1 * | 2/2017 | Whitaker | B64C 27/00 |
| 2017/0113816 | A1 * | 4/2017 | High | B64F 3/00 |
| 2019/0106212 | A1 * | 4/2019 | Furukawa | B65H 75/4484 |
| 2019/0256207 | A1 | 8/2019 | Nohmi et al. | |
| 2020/0216173 | A1 | 7/2020 | Suefuku | |
| 2020/0319642 | A1 * | 10/2020 | Liu | G03B 17/561 |
| 2021/0009285 | A1 * | 1/2021 | Talke | H02G 11/02 |
| 2021/0138281 | A1 * | 5/2021 | Nohmi | B64F 3/02 |
| 2021/0146388 | A1 | 5/2021 | Crowley | |
| 2021/0316858 | A1 * | 10/2021 | Pargoe | B64U 10/14 |
| 2021/0341128 | A1 * | 11/2021 | Abron | G09F 19/12 |
| 2022/0023685 | A1 * | 1/2022 | Nohmi | B64U 10/13 |
| 2022/0236745 | A1 * | 7/2022 | Fagiano | G05D 1/085 |
| 2022/0276055 | A1 * | 9/2022 | Candido | G08G 5/26 |
| 2022/0285836 | A1 * | 9/2022 | Badichi | H01Q 3/02 |
| 2023/0312146 | A1 * | 10/2023 | Kinoshita | B64U 60/50 244/114 R |
| 2023/0331366 | A1 * | 10/2023 | Opitsch | B64U 10/30 |
| 2023/0331409 | A1 * | 10/2023 | Opitsch | B64B 1/50 |
| 2023/0409047 | A1 * | 12/2023 | Opitsch | G05D 1/0291 |
| 2024/0059428 | A1 * | 2/2024 | Marcum | B64F 1/14 |
| 2024/0122171 | A1 * | 4/2024 | Khait | A01M 7/006 |
| 2024/0196816 | A1 * | 6/2024 | Abramyan | A01G 25/09 |
| 2024/0239527 | A1 * | 7/2024 | Benson | B64U 20/70 |
| 2024/0253819 | A1 * | 8/2024 | Mathew | B64U 50/34 |
| 2024/0286773 | A1 * | 8/2024 | Humann | B64U 10/60 |
| 2025/0098660 | A1 * | 3/2025 | Sauder | A01C 23/04 |

OTHER PUBLICATIONS

European Patent Office, Search Report for related EP Application No. 23162582, dated Aug. 2, 2023, 11 pages.

* cited by examiner

SUPPLY SYSTEM FOR A VEHICLE CONNECTED TO A PLATFORM

FIELD

The present disclosure relates generally to a supply system with a bendable connection element for connecting a vehicle to a platform.

BACKGROUND

Figure 1:
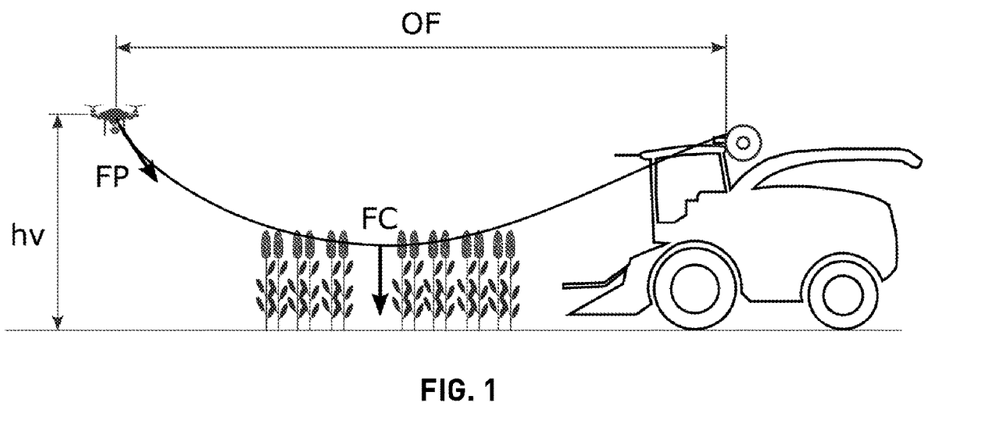
FIG. 1 illustrates an aerial vehicle connected with an agricultural vehicle by a wire.

DE 10 2016 202 627 A1 discloses an arrangement with an aerial vehicle connected by a wire to an agricultural vehicle. The wire can be used to supply the aerial vehicle with electrical energy or to exchange data between the aerial vehicle and the agricultural vehicle. The aerial vehicle has rotors to fly. The rotational speed of the rotors can be adjusted to provide propulsive drive but also serves to compensate a pulling force applied by the wire due to its weight. The more distant the aerial vehicle is flying away from the agricultural vehicle the longer is the free length of the wire between the aerial vehicle and the agricultural vehicle. As can be seen in FIG. 1, on the one hand, a long wire may have a great slack so that the wire may collide with an object such as crop. On the other hand, the longer the free length of the wire is the greater is the weight force FC of the wire. In general, the vertical weight force FC exerted by the weight of a wire can be derived from the equation (1):

$FC=(LC \times WLC) \times g$, wherein

LC is the free length of the wire,
WLC is the weight of the wire per length, and
g is the standard gravity which is considered to be constant at about 9.81 m/s².

In a simplified approach, the weight force FC rests in the middle of the free length of the wire in vertical direction causing a pulling force FP in the wire. The pulling force FP rises with the free length of the wire. Since the pulling force FP acts on the aerial vehicle the pulling force FP may cause a side drift of the aerial vehicle which must be compensated by actively driving the propulsion system of the aerial vehicle to keep position. This results in energy consumption which increases with the length of the wire.

BRIEF SUMMARY

A pulling force in a bendable connection element of a supply system can depend on several factors as wind force, weight of the bendable connection element or length of the bendable connection element. The length of the bendable connection element may influence a slack of the bendable connection element. It is an objective to mitigate the pulling force in a bendable connection element of a supply system connected to a vehicle to reduce the energy consumption caused by the pulling force as well as to avoid a collision of the bendable connection element with an object as for example crop due to a slack of the bendable connection element.

The greater the pulling force in the bendable connection element is the greater a lifting effect caused by the at least one floating unit is needed to compensate the pulling force. The pulling force in the bendable connection element may be influenced by the at least one value of the distance between the first end and the platform, the length of the floating portion (unwound portion) of the bendable connection element, the weight of the floating portion of the bendable connection element, the height of the bendable connection element over ground and/or an ambient condition as wind speed, temperature, barometric pressure or the like.

According to an aspect of the invention there is provided a supply system for connecting a first vehicle. The supply system includes a platform, a first vehicle and a bendable connection element having one end connected with the first vehicle and another end connected with the platform. The supply system includes at least one floating unit for lifting the bendable connection element at least partly over a minimum floating height. The at least one floating unit is attachable to the bendable connection element distant from the first vehicle.

Since the at least one floating unit is attachable to the bendable connection element the lifting effect can be adapted to the pulling force in the bendable connection element. The lifting effect can be raised if a floating unit is (additionally) attached to the bendable connection element. The lifting effect may be reduced if a floating unit is detached from the bendable connection element. I. e. the number of floating units attached to the bendable connection element may be adapted to the pulling force of the bendable connection element.

The bendable connection element may be a wire for supplying the first vehicle or the floating unit with electrical energy and/or for exchanging data between the first vehicle, the floating unit and the platform. The at least one floating unit may float in the air to carry the bendable connection element in the air or may float on a surface of water to carry the bendable connection element in the water. Thus, the at least one floating unit has a lifting effect contrary to the weight force of the bendable connection element resulting in at least a partly compensation of the weight force and consequently in a mitigation of the pulling force in the bendable connection element.

The platform may be stationary or moveable and may comprise an energy storage as a battery or a data storage as a memory both being in connection with the bendable connection element. The supply system may include a control unit to process signals or data. The data may comprise control instructions to control the first vehicle or sensor data generated by the first vehicle.

The supply system may include a sensor for determining a height of an obstacle.

The sensor for determining a height of an obstacle may be configured to determine an obstacle such as a radar senor or a LIDAR sensor for example. The control unit may determine a minimum floating height being higher than the height of the obstacle to avoid a collision between the at least floating unit and the obstacle. The obstacle may be a plant such as a tree or crop for example.

The supply system may include a control unit configured to determine a first clamping position on the bendable connection element, to determine an unwound length of the bendable connection element between the first vehicle and the platform and to determine a first length of the bendable connection element between the first vehicle and the first clamping position. A first floating unit may be attached to the bendable connection element if the unwound length of the bendable connection element reaches the first length of the bendable connection element.

The unwound length of the bendable connection element between the first vehicle and the platform may be determined by sensory measuring the length of the bendable connection element between the first vehicle and the platform. Alternatively, the unwound length may be estimated by the control unit 14 based on an offset between the first vehicle and the platform. The offset is a distance between the first vehicle and the platform. The control unit may receive position signals of the first vehicle and the platform from a global navigation satellite system (GNSS) such as GPS or Galileo to determine the offset. The unwound length of the bendable connection element may be continuously determined by the control unit 14.

The first clamping position may be determined by the control unit for example in dependence of the pulling force of the bendable connection element resulting from the weight of the bendable connection element and/or the buoyant force of the at least one floating unit. When the first vehicle moves away from the platform the first vehicle pulls on the bendable connection element wherein the unwound length of the bendable connection element increases. If the unwound length of the bendable connection element reaches the first distance the control unit may generate a trigger signal for attaching the floating unit to the bendable connection element.

The control unit may be configured to determine a second clamping position on the bendable connection element and to determine a second length of the bendable connection element between the first vehicle and the second clamping position. A second floating unit may be attached to the bendable connection element if the unwound length of the bendable connection element reaches the second length of the bendable connection element.

The control unit may determine the second length of the bendable connection element analogously to the first length of the bendable connection element. When the second floating unit is attached to the bendable connection element the lifting effect can be increased and the pulling force in the bendable connection element may be mitigated. The second clamping position at which the second floating unit may be attached to the bendable connection element may be individually determined.

The control unit may be configured to determine a slack of the bendable connection element between the first and the second clamping position.

The first clamping position or any other clamping position may be defined as a previous clamping position. A clamping position on the bendable connection element following after the previous clamping position may be defined as a subsequent clamping position, e. g. the second clamping position if the previous clamping position is the first clamping position.

While the floating units lift the bendable connection element at the first clamping position and the second clamping position, the weight force of bendable connection element between the first and the second clamping position pulls the bendable connection element down to the ground. The slack depends on the length of the bendable connection element being longer than the distance between the first clamping position and the second clamping position and may be calculated by the control unit based on these parameters.

The length of the bendable connection element between the first and the second clamping position may be short enough that a slack of the bendable connection element between the first and the second clamping position may be liftable by the first and the second floating unit above the minimum floating height of the bendable connection element.

The shorter the length of the bendable connection element between the first clamping position and the second clamping position is the smaller the slack of the bendable connection element may be. So, the control unit may be configured to determine a length of the bendable connection element between the first clamping position and the second clamping position based on an expected slack between these two positions.

As mentioned before, the minimum floating height may be higher than the height of an obstacle.

The second clamping position may be determined based on the weight per length of the bendable connection element and the length of the bendable connection element from the first to the second clamping position. The length of the bendable connection element from the first to the second clamping position may be long enough that the bendable connection element from the first to the second clamping position may be liftable by the first and the second floating unit below a maximum floating height of the bendable connection element.

The longer the length of the bendable connection element between the first clamping position and the second clamping position is the greater is the weight force of the bendable connection element between the first and the second clamping position. So, the control unit may be configured to determine a clamping position based on the weight of the bendable connection element and to determine the floating height of the bendable connection element.

The control unit may be configured to determine a third clamping position on the bendable connection element so that the length of the bendable connection element between the first clamping position and the second clamping position is equal to the length of the bendable connection element between the second clamping position and the third clamping position.

So it may be sufficient that the control unit may determine one length value only instead of different length values for each additional clamping position. In addition, the lifting effect of the floating units can be evenly distributed along the bendable connection element.

The control unit may be configured to detect if at least a portion of the bendable connection element between the first and the second clamping position is floating below the minimum floating height and/or floating above a maximum floating height.

If the minimum or maximum floating height is exceeded the bendable connection element or at least one floating unit may collide against an obstacle. Since the control unit is configured to adjust the floating height of the bendable connection element or the at least one floating unit by increasing or reducing the distance between the first and the second clamping position, the control unit may be configured to avoid a collision with an obstacle above the maximum floating height such as an overhead power line for example as well as a collision with an obstacle below the minimum floating height such as a tree or crop.

The determination of a clamping position may be based on the minimum floating height of the bendable connection element, a maximum floating height of the bendable connection element, a maximum floating height of the at least one floating unit, a height of the first vehicle, a height of the platform, a weight force of the bendable connection element, an ambient temperature, a barometric pressure, a weight force of the floating unit or a buoyant force of the at least one floating unit.

Each of the afore mentioned values may be determined by a corresponding sensor connected with the control unit. The control unit may also determine the pulling force based on at least one of the values. The weight of the floating portion of the bendable connection element may be calculated by the control unit based on the length of the floating portion of the bendable connection element. The control unit may also determine the lifting effect of each floating unit and thus determine an appropriate number of floating units with respect of the at least one value.

The supply system may include a winch for winding or unwinding of the bendable connection element and a control unit configured to control the winch and to determine a clamping position for attaching the at least one floating unit to the bendable connection element. The control unit may stop an unwinding of the bendable connection element if the clamping position is reached. The control unit may also control the length of the floating portion (unwounded portion) of the bendable connection element and thus the maximum offset the first vehicle can move away from the platform. The winch may be driven by a motor.

When the clamping position is reached an operator may manually attach a floating unit to the bendable connection element at the clamping position. Unwinding of the bendable connection element may be continued after a confirmation of the operator.

The at least one floating unit may be detached from the bendable connection element if a distance between the at least one floating unit and the platform falls below a threshold.

The pulling force in the bendable connection element may be getting lower, for example when the first vehicle connected to the bendable connection element moves back to the platform. When the first vehicle moves back to the platform the distance between the at least one floating unit and the platform may be reduced, too. So, the distance between the floating unit and the platform may be an indicator of the current pulling force in the bendable connection element. Due to the mitigated pulling force in the bendable connection element the lifting effect caused by the at least one floating unit can be adapted and reduced by detaching the at least one floating unit from the bendable connection element.

The control unit may be configured to control the position of the first vehicle.

The position of the first vehicle may be adjusted in all Cartesian coordinates.

The at least one floating unit may include a clamping unit switchable between a fixed state for attaching the floating unit to the bendable connection element and a released state for detaching the floating unit from the bendable connection element.

The clamping unit of a floating unit may switch automatically into the fixed state when the clamping position of the corresponding floating unit is reached. The clamping unit may switch automatically into the released state, for example when the distance between the at least one floating unit and the platform falls below the threshold mentioned before. The clamping unit may be triggered by the control unit. The clamping unit may be supplied with (electrical) energy via the bendable connection element.

The clamping unit may include an actuator configured to switch into the released state when the actuator is energized with electrical energy and to switch into the fixed state when the actuator is deenergized.

The actuator may be a combination of a solenoid and a mechanical spring. In the fixed state, the spring may press against the bendable connection element and thus cause a friction force for clamping the clamping unit to the bendable connection element. In the released state, the solenoid may be energized and may retract the mechanical spring back from the bendable connection element. Thus, the clamping unit can switch automatically into the fixed state in case of a loss of electric energy due to the spring force. The clamping unit may comprise for example a battery to provide the electrical energy needed for the clamping unit. The actuator may be of any other type, for example an electrical motor.

The clamping unit may include a roller being in contact with the bendable connection element.

The roller may be lockable in the fixed state and rotatable in the released state. As long as the roller is rotatable the bendable connection element can be moved relatively to the clamping unit. The roller may be drivable in a rotatable manner by the actuator for moving the clamping unit along the bendable connection element. For example, the roller may be driven by the electrical motor. The motor may drive the roller for adjusting the position of the clamping unit on the bendable connection element. When the clamping unit reaches a position at which the floating unit shall be attached to the bendable connection element the roller may be locked to prevent a relative movement between the bendable connection element and the clamping unit. The relative movement may be prevented due to a friction force between the bendable connection element and the locked roller.

The bendable connection element may have a tubular shape for transferring a fluid. The fluid may be a gas such as helium for increasing the lifting effect. The fluid may be transferred to the first vehicle via the bendable connection element for supplying the first vehicle with gas. The first vehicle may comprise a gas volume for causing a lifting effect. The amount of gas in the gas volume can be adjusted by the gas transferred via the bendable connection element. Alternatively, the fluid may be a substance for field operation such as a fertilizer for fertilizing crop.

The clamping unit may include an aperture for passing a fluid transferred in the bendable connection element. The aperture may be bore or a passage so that the fluid can be applied to an object, for example to spray a fertilizer on crop.

The first vehicle may be an unmanned aerial vehicle. The unmanned aerial vehicle may be a drone or the like configured to fly autonomously. The unmanned aerial vehicle may comprise at least a sensor, for example a camera for optical capturing of the ground.

The supply system may include a second vehicle wherein the platform is mounted on a base body or any other part of the second vehicle.

The second vehicle may be an agricultural vehicle as a tractor, a combine, a harvester, a sprayer or the like. The platform may be connectable to any energy source of the second vehicle as the vehicle battery, a compressor or any fluid circuit to supply the first vehicle and/or the at least one floating unit with any kind of energy as electric energy or gas via the bendable connection element. The platform may be connectable to a control unit of the second vehicle to exchange data or signals between the first vehicle, the at least one floating unit and the second vehicle via the bendable connection element. The control unit of the second vehicle may control any components of the supply system as the first vehicle, the at least one clamping unit or the winch. If the platform is mounted on the base body of the second vehicle the platform is easily accessible for an unmanned aerial vehicle for landing or for taking off.

The at least one floating unit may include an envelope for enclosing a gas volume.

The envelope may be a balloon to avoid an escape of the gas to the air. In case of a floating unit floating in the air the gas may be hydrogen or helium or any other gas having a density being lower than the density of air so that the lifting force of the floating unit is caused by the gas volume. In case of a floating unit floating in water the gas may be air or any other gas having a density being lower than the density of water.

The supply system may include a reservoir for supplying the envelope or the bendable connection element with helium or any other fluid.

An installation of the reservoir in the platform or in the second vehicle reduces the weight of the first vehicle. The fluid in the reservoir can be used to fill the enclosed gas volume of the floating unit with gas and thus to increase the lifting effect. Conversely, the gas in the gas volume can be returned to the reservoir to reduce the lifting effect. Alternatively, the fluid may be a fertilizer or a pesticide to treat the crop. The fluid may be transferred from the reservoir to the bendable connection element wherein the bendable connection element may be used to discharge the fluid on the crop.

The at least one floating unit may include a rotor unit for positioning a portion of the bendable connection element located between the first vehicle and the platform.

The rotor unit may be an electric motor to drive a propeller attached to the envelope. The rotor unit may be supplied with electrical energy via the bendable connection element. Environmental influences as wind or waves may drift the floating unit out of a primary position while the floating unit floats in the air or in the water. To compensate any side drift and for repositioning the floating unit back to the primary position the rotor unit may propel the propeller. The repositioning of the floating unit repositions also the portion of the bendable connection element to which the clamping unit of the floating unit is connected with.

Finally, the control unit may be configured to determine a number of floating units to be attached to the bendable connection element depending on at least one value of a distance between the first vehicle and the platform, a length of the floating portion of the bendable connection element, a weight of the floating portion of the bendable connection element, a height of the bendable connection element over ground and/or an ambient condition.

According to an aspect of the invention there is provided a method for attaching a floating unit to a bendable connection element connected with a first vehicle comprising the steps of determining a buoyant force of a floating unit, determining a clamping position on the bendable connection element, determining an unwound length of the bendable connection element, determining a length between the first vehicle and the clamping position, detecting when the unwound length of the bendable connection element reaches the length between the first vehicle and the clamping position, and attaching the floating unit at the clamping position when the unwound length of the bendable connection element has reached the length between the first vehicle and the clamping position.

The method may comprise additional steps. The control unit may be configured to carry out the method. The control unit 14 may execute all steps or only individual steps of method or additional steps. The method may be a computer-implemented method and may be stored in the memory of the control unit. The clamping position on the bendable connection element may be determined based on the buoyant force of the floating unit.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 2:
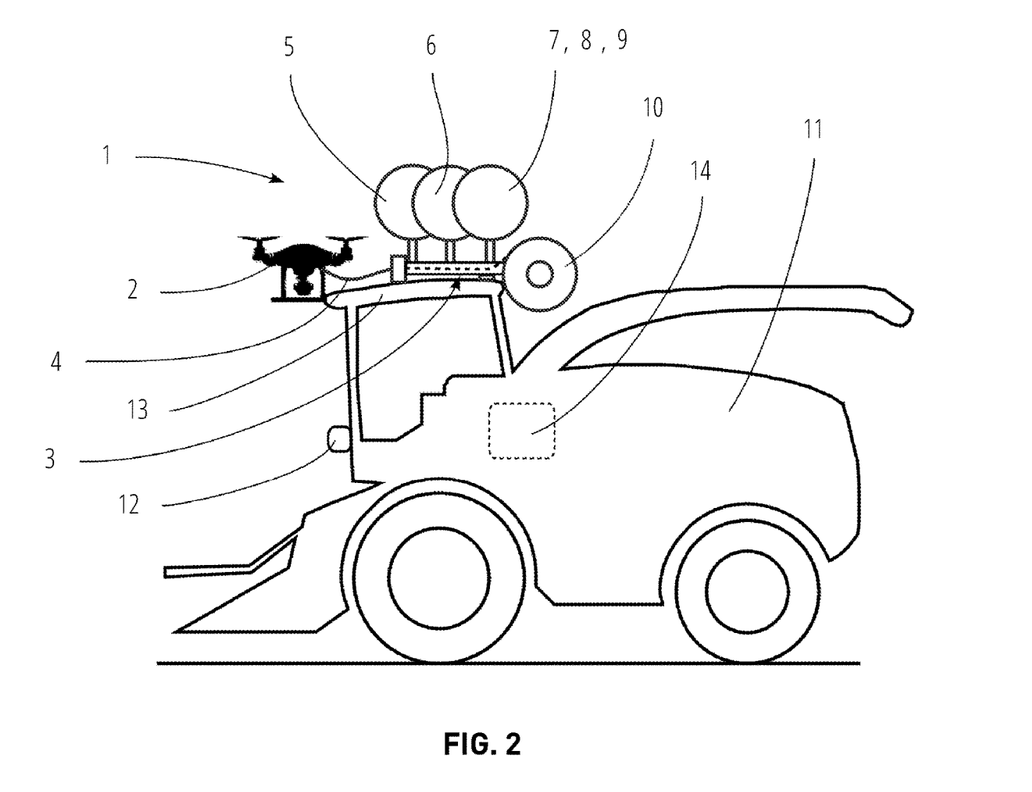
FIG. 2 illustrates a supply system for connecting an aerial vehicle as a first vehicle.

FIG. 2 shows a supply system 1. The supply system 1 comprises a platform 3, a first vehicle 2, a bendable connection element 4 having one end connected with the first vehicle 2 and another end connected with the platform 3 and at least one floating unit 5, 6, 7, 8 and 9 for lifting the bendable connection element 4, a winch 10 for winding or unwinding of the bendable connection element 4 and a control unit 14. The first vehicle 2 may be an aerial vehicle (drone). The platform 3 of the supply system 1 is mounted on a base body 13 designed as a roof of a second vehicle 11. The base body 13 comprises a vertical axis about which the platform 3 is rotatably connected to the base body 13. The second vehicle 11 is an agricultural vehicle and may be of any type as for example a tractor, a harvester or a sprayer. The first vehicle 2 is placed on the base body 13 of the second vehicle 11. The second vehicle 11 comprises a sensor 12 for determining a height 19 of an obstacle 18 in front of the second vehicle 11 (see FIG. 4). The obstacle 18 may be crop to be treated by the second vehicle 11 as for example to harvest the crop or to apply a fertilizer or a pesticide. The control unit 14 is integrated in the second vehicle 11. Alternatively, the control unit 14 can be integrated in the supply system 1. The control unit 14 receives signals from the sensor 12 and is configured to control the components of the supply system 1. Additionally, the control unit 14 may be configured to control also components of the second vehicle 11 such an engine. The winch 10 may comprise a motor controllable by the control unit 14 to wind up or unwind the bendable connection element 4.

As can be seen in FIG. 2, the floating units 5 to 9 are stored on the platform 3, the bendable connection element 4 is wound up by the winch 10 and the first vehicle 2 is placed on the base body 13 of the second vehicle 11. Each floating unit 5 to 9 may be filled with a fluid, such as helium, to generate a buoyant force so that the floating units 5 to 9 may float and carry the bendable connection element 4 in the air.

Figure 3:
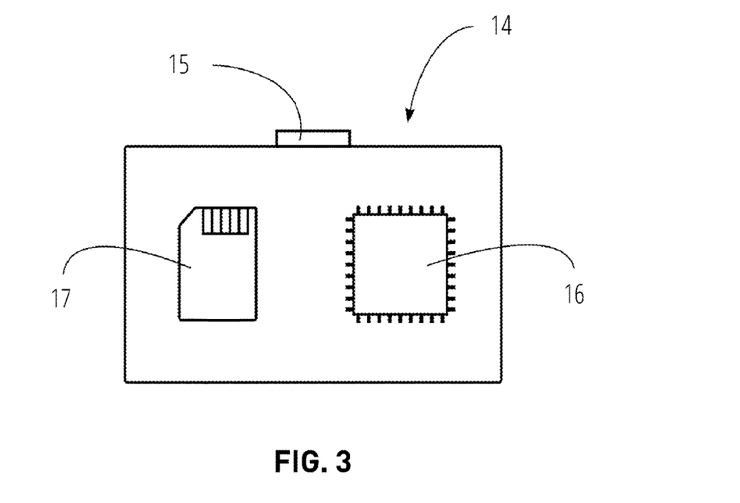
FIG. 3 illustrates a control unit.

FIG. 3 shows the control unit 14 comprising an interface 15, a controller 16 and a memory 17. The control unit 14 may receive and send signals or data via the interface 15. The interface 15 may be a wireless interface or a connector. The controller 16 may store the data or signals received by the control unit 14 in the memory 17. The memory 17 may contain additional data or executable programs, for example in terms of a computer-implemented method, that may be retrieved, processed or carried out by the controller 16. Data or signals resulting from the processing of data or signals or from the execution of a program may be stored to the memory 17 or sent to the interface 15 by the controller 16.

Figure 4:
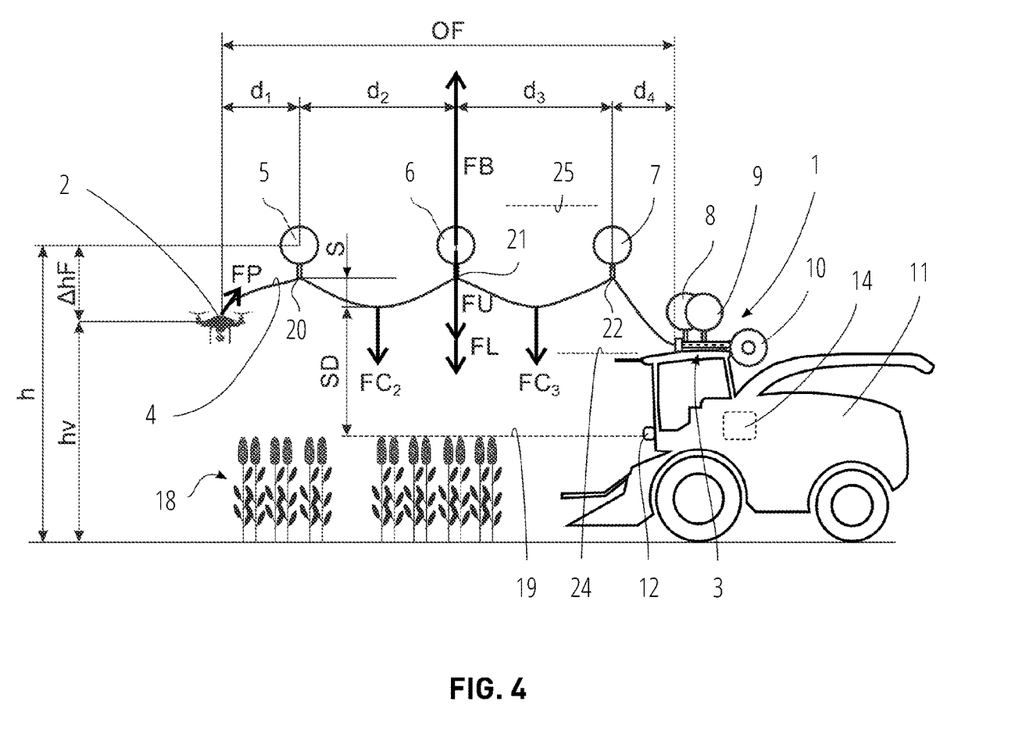
FIG. 4 illustrates the supply system for connecting a first vehicle.

In contrast to FIG. 2 with the first vehicle 2 on the base body 13, FIG. 4 shows the first vehicle 2 flying in front of the second vehicle 11 at a height hv. The first vehicle 2 is distant from the platform 3 by an offset OF. The first vehicle 2 connected with the bendable connection element 4 has unwound the bendable connection element 4 partly from the winch 10. Three floating units 5, 6 and 7 attached to the bendable connection element 4 were pulled out of the platform 3 together with the bendable connection element 4 and float in the air for lifting the bendable connection element 4 over the height 19 of the obstacle 18. All three floating units 5 to 7 may float approximately at the same floating height h. According to the floating height of the floating units floating in the air the floating height of the bendable connection element 4 is adjusted. The other floating units 8 and 9 are still stored at the platform 3.

Figure 8:
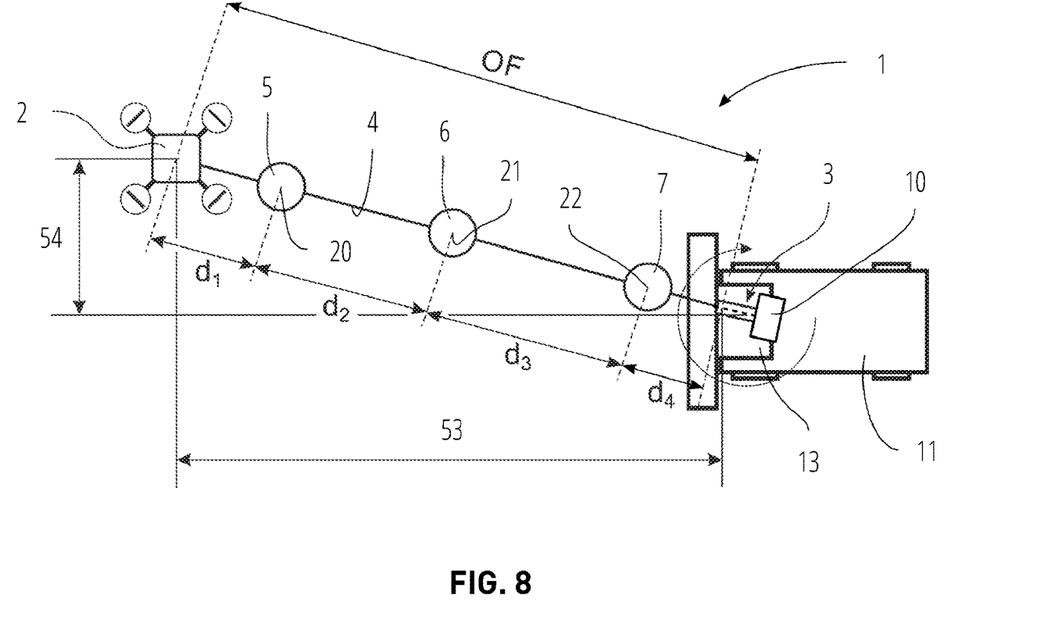
FIG. 8 illustrates a top view of the supply system.

Floating unit 5 is attached to the bendable connection element 4 at a clamping position 20 distant from the first vehicle 2 by a distance $d_1$. Floating unit 6 is attached to the bendable connection element 4 at a clamping position 21 distant from the floating unit 5 by a distance $d_2$. Floating unit 7 is attached to the bendable connection element 4 at a clamping position 22 distant from the floating unit 6 by a distance $d_3$ and distant from the platform 3 by a distance $d_4$. I. e. the sum of the distances $d_1$, $d_2$, $d_3$, and $d_4$ corresponds to the offset OF. The offset OF may vary for different agricultural operations. E. g. where the first vehicle 2 is used to detect wild animals in front of the second vehicle 11, the offset OF may be greater as an operator of the second vehicle 11 may be warned earlier before reaching the wild animals to visually check the sensor detection or e. g. timely stop the second vehicle 11 or intervene anyhow. Where the first vehicle 2 is used to detect crop growth to automatically adjust machine setting, the offset OF may be smaller as the control loop is very fast. As can be seen in FIG. 8, the offset OF may have a longitudinal segment 53 and a transverse segment 54 and may be calculated based on the longitudinal segment 53 and the transverse segment 54 according to the Pythagorean theorem.

The weight force $FC_2$ resulting from the length of the bendable connection element 4 between the first clamping position 20 and the second clamping position 21 and the weight force $FC_3$ resulting from the length of the bendable connection element 4 between the second clamping position 21 and the third clamping position 22 can be calculated by the control unit 14 under consideration of equation (1) as mentioned above, as well as the weight forces of the other portions of the bendable connection element 4 floating in the air. The weight force FU of each floating unit 5 to 9 comprises all components of a floating unit including the envelope 29 but without the fluid and may be a constant. The weight force FU may be stored in the memory 17 of the control unit 14. The weight of the fluid in a floating unit, such as helium, results in a weight force FL that may be determined by the control unit 14 according to equation (2):

$FL = mL \times g$, wherein g is the standard gravity which is considered to be constant at about 9.81 m/s$^2$, and mL is the weight of the lifting gas which can be determined according to equation (3):

$mL = \rho L \times VL$, wherein $\rho L$ is the density of the lifting gas, and VL is the volume of the lifting gas.

The control unit 14 may consider that the weight of the bendable connection element 4 is evenly distributed from the first vehicle 2 to the platform 3. Since a portion of the bendable connection element 4 between two clamping positions is carried by two floating units each floating unit carries the half of the weight of the portion of the bendable connection element 4 at the left side and the half of the weight of the portion of the bendable connection element 4 at the right side as for example illustrated in FIG. 4: Floating unit 6 carries $0.5 \times FC_2$ and $0.5 \times FC_3$.

To keep a floating unit 5 to 9 at a constant floating height h the buoyant force FB of each floating unit 5 to 9 must be balanced with the overall forces (FC, FU, FL) exerted in opposite direction. The buoyant force FB of each floating unit 5 to 9 may be determined by the control unit 14 with reference to Archimedes law depending on the mass of the air which is displaced by the volume of a floating unit according to equation (4.1):

$FB = ma \times g$, wherein ma is the mass of the displaced air, and g is the standard gravity which is considered to be constant at about 9.81 m/s$^2$.

Further considering, that the mass of the displaced air can be calculated depending on the density and the volume of the displaced air the following equation (4.2) is received:

$FB = \rho a \times Va \times g$, wherein $\rho a$ is the density of the displaced air, and Va is the volume of the displaced air.

Thus, the control unit 14 is configured to determine an amount of fluid for each floating unit 5 to 9 so that the bendable connection element 4 can be carried by the floating units at least partly at a specific floating height that may be determined by an operator. The control unit 14 is also configured to determine a number of floating units needed to carry the bendable connection element 4 at least partly at a specific floating height in dependence of the amount of fluid of each floating unit. The floating height may be above the height of the platform 3 or the flight level of the first vehicle 2 so that only a portion of the bendable connection element 4 carried by two or more floating units may float above the floating height while another portion of the bendable connection element 4 may be below the floating height. The floating height of the bendable connection element 4 can be limited between a minimum floating height 24 being above the height 19 of the obstacle 18 and below a maximum floating height 25. The control unit 14 may consider a safety distance SD between the obstacle 18 a slack S of the bendable connection element 4 for the determination of the minimum floating height 24. If the connection is provided without any slack S meaning that the bendable connection element 4 extends straight horizontally, the supply system 1 may be more prone to wind, as any side drift of one floating unit is immediately moving an adjacent floating unit similar to a rigid connection. These considerations result in a target value for the floating height h, which is h=hv+ΔhF+s. The maximum floating height 25 may be determined by the operator.

The control unit 14 may determine the amount of fluid for each floating height to carry the bendable connection element 4 between the minimum floating height 24 and the maximum floating height 25. The control unit 14 may also determine the number of floating units to be attached to the bendable connection element 4. The control unit 14 may also consider the size of the floating units 5 to 9 and a slack S of the bendable connection element 4 for the determination of the amount of fluid in respect of the minimum and maximum floating height 24 and 25 wherein the slack S may be determined by the control unit 14 based on the length of the bendable connection element 4 from one clamping position to another clamping position (e. g. clamping positions 20 and 21) and the distance between these both clamping positions (e. g. distance $d_2$).

The control unit 14 may consider that the geometry of the bendable connection element 4 between two floating units is not a regular geometry but may have parabolic shape horizontally extending towards the clamping positions. The shape depends on the physical properties (e. g. stiffness of the bendable connection element 4, weight of the bendable connection element 4 per length). So for a first estimation, the control unit 14 may take a simplified geometry for the slack. Alternatively, the control unit 14 may access a characteristic map providing the effective length of the bendable connection element 4 considering slack S depending on the distance d between the two clamping positions. These data may be provided by a cable manufacturer and enables the control unit 14 to determine the force FC applied by the weight of the bendable connection element 4 per distance d.

Optionally, the control unit 14 may be provided with a model recognizing relevant parameters for buoyance (such as dependency of densities ρa or ρL and/or volumes Va and VL depending on temperature and/or geographical height. Similarly, a model may be available to determine the weight of the bendable connection element 4 and the weight force FC depending on the distance d based on the exact geometry of the slack considering that the mass of the bendable connection element 4 does not apply in the mid of adjacent floating units but is distributed on the complete length between two floating units. Another model may enable the control unit 14 to position floating units at different heights and varying distances d between each floating unit. This may be preferable used when the floating heights of the floating units 5 to 9 are ascending towards the first vehicle 2.

Since the portion of bendable connection element 4 between the platform 3 and the first clamping position 20 is carried by the floating units 5 to 7 the remaining portion of the bendable connection element 4 to be carried by the first vehicle 2 is very short resulting in a much reduced share of weight force of the bendable connection element 4 to be carried be the first vehicle 2. Thus, the pulling force FP of the bendable connection element 4 acting on the first vehicle 2 is much smaller compared to a situation as shown in FIG. 1 where the aerial vehicle has to carry the full length of the wire.

The control unit 14 may be configured to control the first vehicle 2 and to adjust the position of the first vehicle 2 so that the first vehicle keeps a flight height between the minimum floating height 24 and the maximum floating height 25.

Figure 5:
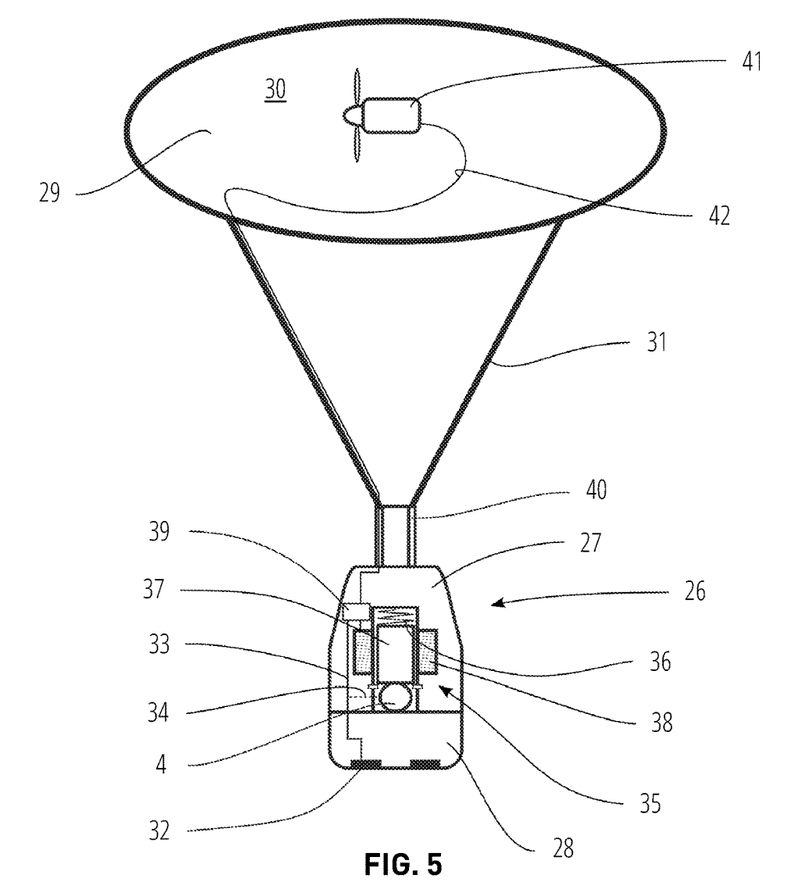
FIG. 5 illustrates a floating unit.

FIG. 5 shows any one of the at least one floating units 5 to 9. The floating unit comprises a clamping unit 26 switchable between a fixed state for attaching the floating unit to the bendable connection element 4 and a released state for detaching the floating unit from the bendable connection element 4. The floating unit also comprises an envelope 29 for enclosing a gas volume 30. As mentioned above, the envelope 29 may be filled with a fluid, such as helium, to generate a buoyant force so that the floating unit may float in the air. A rope 31 connects the envelope 29 with the clamping unit 26. The rope 31 is guided in a protective sleeve 40 to avoid a damage of the rope 31.

The clamping unit 26 comprises an actuator 35 configured to switch into the released state when the actuator 35 is energized with electrical energy and to switch into the fixed state when the actuator 35 is deenergized. The actuator 35 is connected with a first electrical interface 32 via a power line 33 and may be energized by an external power supply connected to the first electrical interface 32. The first electrical interface 32 may be an inductive interface. Optionally, the actuator 35 may be connected to the bendable connection element 4 via a power line 34 and may be energized by a power supply connected with the bendable connection element 4. It is also possible that the first electrical interface 32 may receive energy by inductive loading via the current/voltage passing through the bendable connection element 4. In addition, the actuator 35 is connected to an internal battery 39 integrated in the clamping unit 26 and connected to the power line 33. The battery 39 may energize the actuator 35 if needed.

The actuator 35 comprises a piston 37 axially movable housed in the clamping unit 26 and a mechanical spring 36 forcing the piston 37 towards the bendable connection element 4. The actuator 35 also comprises a solenoid 38. In the released state, the solenoid 38 is energized to retract the piston 37 back from the bendable connection element 4. Thus, the clamping unit 26 may be moved along the bendable connection element 4. In the fixed state, the solenoid 38 is deenergized so that the mechanical spring 36 presses the piston 37 against the bendable connection element 4 to cause a friction force for clamping the bendable connection element 4 in the clamping unit 26. I. e., the clamping unit 26 of the floating unit is fixed in position relative to the bendable connection element 4 with the piston 37 pressed on the bendable connection element 4 by the force of spring 36. The clamping unit 26 can also switch automatically into the fixed state in case of a loss of electrical energy due to the spring force.

As long as the floating unit is stored at the platform 3 the interface 15 of the control unit 14 is connected with the electrical interface 32 of the clamping unit 26 to send control signals to the actuator 35. Optionally, the bendable connection element 4 may be used as a signal line and the control unit 14 may send control signals to the actuator 35 via the bendable connection element 4 and the lines 33 and 34. I. e., the control unit 14 is configured to trigger the clamping unit 26 for switching the actuator 35 into the released or the fixed state. Analogously, the control unit 14 may control the battery 39 for energizing or deenergizing the solenoid 38.

The control unit 14 may also use the bendable connection element 4 as signal line to communicate with the first vehicle 2.

The clamping unit 26 comprises an upper part 27 being detachably connected to a lower part 28. The detachable assembly of the lower part 28 enables maintenance or replace of a floating unit easily. The upper part 27 and the lower part 28 may be made of alloy or any other lightweight material to reduce weight but enabling further installations.

Figure 6A:
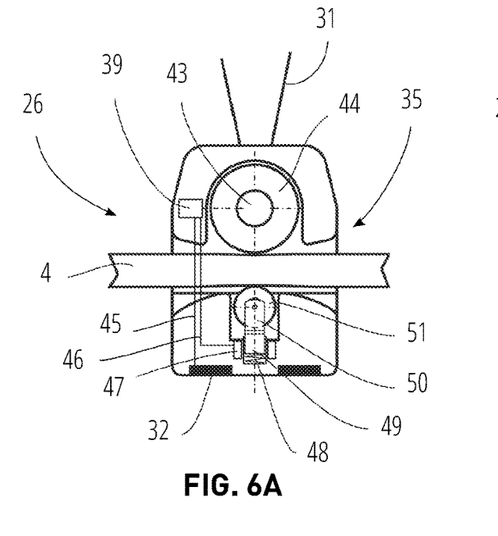
FIG. 6A illustrates an embodiment of an actuator for a clamping unit.
Figure 6B:
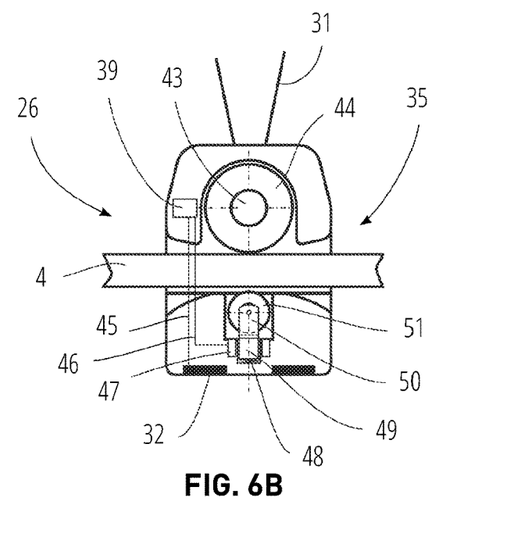
FIG. 6B illustrates an embodiment of an actuator for a clamping unit.

As can be seen in FIG. 6A and FIG. 6B, another embodiment of the actuator 35 may be implemented in the clamping unit 26. According to this embodiment, the actuator 35 comprises analogously to the embodiment shown in FIG. 5 a spring 48, a spring actuated piston 49 and a solenoid 47. A lower roller 51 is rotatably mounted in a roller support 50 fixed at an end of the piston 49. The solenoid 47 may be controlled by the control unit 14 and may be energized through the lines 45 and 46 connected with the battery 39 and the electrical interface 32 to switch the actuator 35 into the released state (see FIG. 6B). The solenoid 47 retracts the piston 49 including the lower roller 51 from the bendable connection element 4 for releasing contact between bendable connection element 4 and lower roller 51. As a consequence, frictional contact between bendable connection element 4 and upper roller 44 will also be released allowing free movement so that the bendable connection element 4 can move freely through the clamping unit 26. When the solenoid 47 is deenergized the spring 48 presses the piston 49 towards the bendable connection element 4 to clamp the bendable connection element 4 within the clamping unit 26 for switching the actuator 35 into the fixed state (see FIG. 6A). Then, the lower roller 51 is in circumferential contact with the bendable connection element 4.

In addition, an upper roller 44 being in contact with the bendable connection element 4 and a motor 43 for driving the upper roller 44 are integrated in the clamping unit 26. The motor 43 is connected to the power line 45 to be supplied with electrical energy, for example from the battery 39. The control units 14 may send control signals to the motor 43 through the line 45 to control the speed of the motor 43.

In the fixed state, the frictional contact between upper roller 44 and lower roller 51 keeps the bendable connection element 4 in position when the motor 43 is blocked to not rotate. While the lower and upper rollers 44 and 51 are drawn in a cylindrical shape to ease clarity, the circumference of both rollers 44, 51 may be provided with a circumferential running groove to increase contact surface and provide axial guidance to urge the bendable connection element 4 in between the rollers 44 and 51. Further means can be provided to improve frictional contact such as suitable material e. g. rubber.

When the control unit 14 triggers the motor 43 to rotate the upper roller 44 the clamping unit 26 moves along the bendable connection element 4 to alter the position of the clamping unit 26 on the bendable connection element 4. The motor 43 may drive in one or the other direction to enable a relative movement of the bendable connection element 4 within the clamping unit 26. As lower roller 51 is freely turning, the upper roller 44 rotates on the bendable connection element 4 to change the position of the clamping unit 26. The control unit 14 may determine the revolutions of the motor 43 to determine the distance the clamping unit 26 moved along the bendable connection element 4. Thereby the positional change of the floating unit on the bendable connection element 4 can be determined. The motor 43 may be a stepper motor or any other type of a motor. The bendable connection element 4 may also be used as a signal line for communication between the control unit 14 and the motor 43.

Figure 7A:
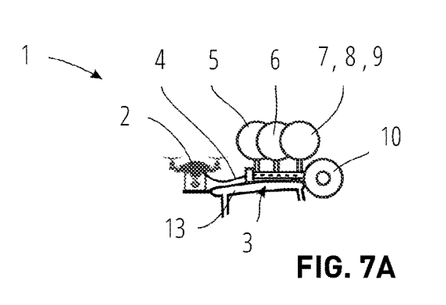
FIG. 7A illustrates the supply system with all floating units stored at a platform.

Based on FIG. 7A to FIG. 7E it will be described now how the floating units will be attached to the bendable connection element 4 when the bendable connection element 4 is being unwound from the winch 10. The control unit 14 may execute several steps of a method shown in FIG. 13 for attaching the floating units to the bendable connection element 4. The method starts with step S100. FIG. 7A shows the supply system 1 with the first vehicle 2 positioned on the base body 13, the bendable connection element 4 wounded up by the winch 10 and all floating units 5 to 9 stored at the platform 3 analogous to FIG. 2. The control unit 14 receives the height 19 of an obstacle 18, e. g. crop to be harvested by the second vehicle 11, from the sensor 12 and determines a minimum floating height 24 above the height 19. Further, the control unit 14 determines a maximum floating height 25, e. g. based on an user input of the operator (see FIG. 13: Step S101). Then, the control unit 14 determines for each floating unit 5 to 9 a buoyant force so that the bendable connection element 4 will be carried by the floating units between the minimum floating height 24 and the maximum floating height 25 as previously described (see FIG. 13: Step S102). Based on the buoyant force, the control unit 14 determines an amount of fluid that is needed in the envelopes 29 of each floating unit to create the buoyant force. The amount of fluid is checked for each floating unit 5 to 9 and is adjusted by the supply system 1 according to the amounts determined by the control unit 14.

Based on the buoyant force resulting from the amount of fluid of each floating unit 5 to 9, the control unit 14 determines a clamping position for each floating unit 5 to 9 at which a floating unit needs to be attached to the bendable connection element 4 when the bendable connection element 4 will be unwound. I. e., the control unit 14 determines a clamping position 20 for floating unit 5, a clamping position 21 for floating unit 6, a clamping position 22 for floating unit 7, and so on (see FIG. 13: Step S103). When determining the clamping positions, the control unit 14 considers also the weight per length of the bendable connection element and the length of the bendable connection element (4) from a previous to a subsequent clamping position (20, 21) so that the bendable connection element 4 will float at a floating height h between the minimum and the maximum floating heights (24, 25). The control unit 14 may consider additional parameters for the determination of a clamping position such as a maximum floating height of the at least one floating unit (5, 6, 7, 8, 9), a height (flight level) of the first vehicle (2), a height of the platform (3), a weight force (FC) of the bendable connection element (4), an ambient temperature, a barometric pressure, a weight force (FU) of the at least one floating unit (5, 6, 7, 8, 9).

The control unit 14 determines for each clamping position a length of the portion of the bendable connection element 4 from the corresponding clamping position to the first vehicle 2. I. e., the control unit 14 determines the length of the bendable connection element 4 between the first vehicle 2 and the first clamping position 20 (first length), the length of the bendable connection element 4 between the first vehicle 2 and the second clamping position 21 (second length), the length of the bendable connection element 4 between the first vehicle 2 and the third clamping position 22 (third length), and so on (see FIG. 13: Step S104).

The control unit 14 may determine the clamping positions such that the distance from one clamping position to another clamping position may be equidistant (for example $d_2=d_3=d_4$), e. g. by determining equidistant lengths of the bendable connection element 4 between the clamping positions, and/or that the distance between the first vehicle 2 and the first clamping position 20 may be the half of the distance between two clamping positions (for example $d_1=0.5 \times d_2$).

Figure 7B:
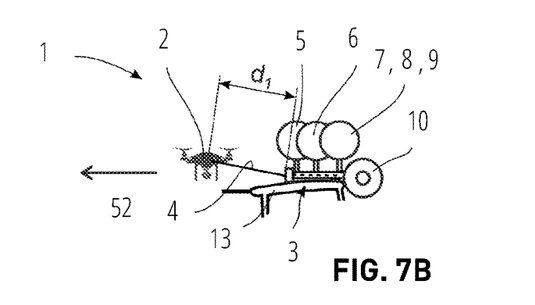
FIG. 7B illustrates the supply system with the first vehicle taking off.

The first vehicle 2 may now take off and start to fly into the direction 52 in front of the second vehicle 11 as shown in FIG. 7B. While the first vehicle 2 flies away from the platform 3 it pulls on the bendable connection element 4 so that the bendable connection element 4 is unwound from the winch 10. The winch 10 may be driven simultaneously to support the unwinding of the bendable connection element 4. The winch 10 continuously measures the length of the unwound portion of the bendable connection element 4. The control unit 14 receives the signals from the winch 10 to determine continuously the length of the unwound portion of the bendable connection element 4 between the first vehicle 2 and the platform 3 (see FIG. 13: Step S105). Optionally, the control unit 14 determines continuously the offset OF between the first vehicle 2 and the platform 3 to estimate the unwound portion of the bendable connection element 4. The offset may be determined by GNSS position signals received from the first vehicle 2 and the second vehicle 11. Alternatively, the length of the unwound portion of the bendable connection element 4 may be calculated by the control unit 14 based on a circumference of a cable reel of the winch 10 and a rotation angle of the winch 10.

Figure 13:
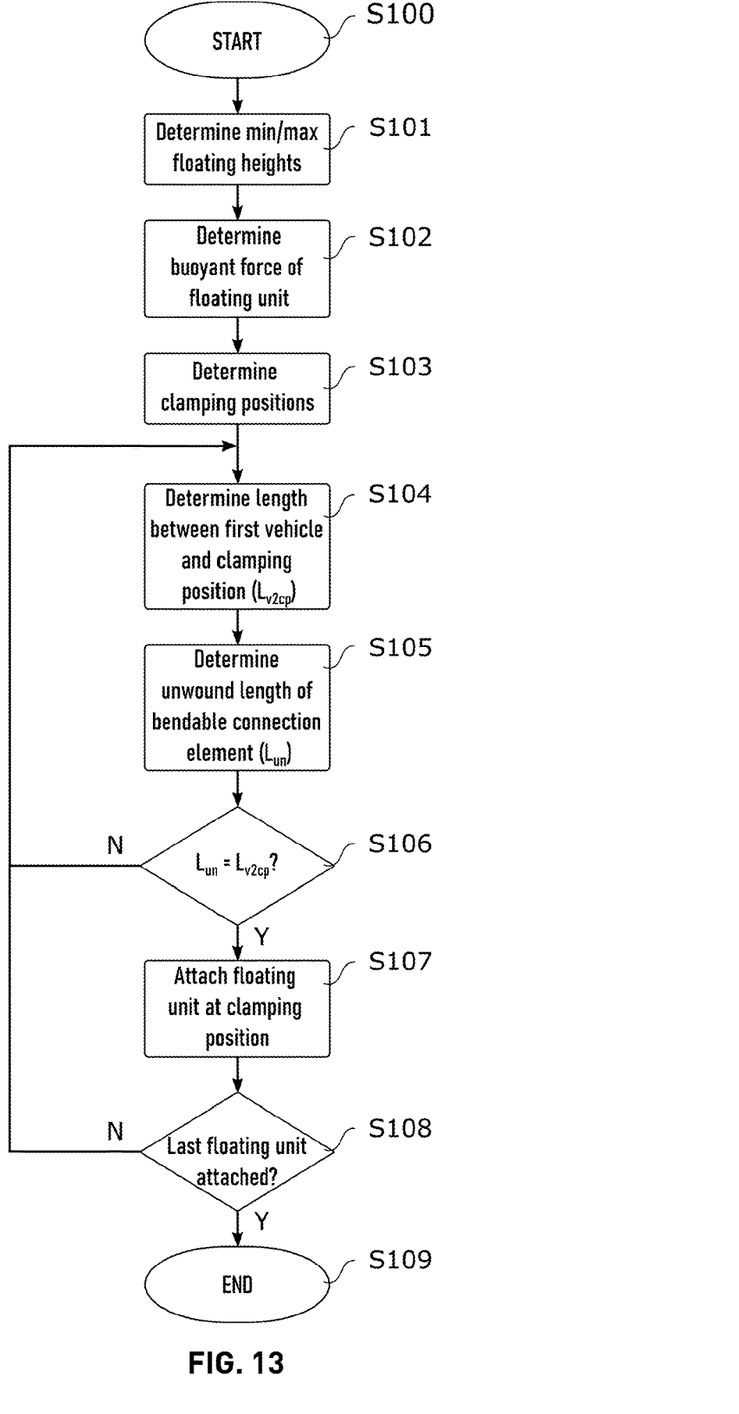
FIG. 13 illustrates a flow chart of a method.

Then, the control unit 14 compares the unwound length of the bendable connection element 4 with the length of the bendable connection element 4 between the first vehicle 2 and the first clamping position 20 (first length) while the first vehicle 2 may fly away from the second vehicle 11 and unwinds the bendable connection element 4 from the winch 10 (see FIG. 13: Step S106). As long as the unwound length of the bendable connection element 4 hasn't reached the clamping position the steps S104 to S106 will be repeated. When the control unit 14 determines that the length of the unwound portion has reached the length between the first vehicle 2 and the first clamping position 20 the control unit 14 initiates an action for attaching the first floating unit 5 to the bendable connection element 4 at the first clamping position 20.

The action may depend on an operation mode the operator may choose. In a manual operation mode, the control unit 14 stops the winch 10 to avoid a further unwinding of the bendable connection element 4 from the winch 10 so that the operator may manually attach the first floating unit 5 at the first clamping position 20 of the bendable connection element 4. The control unit 14 may advice the operator how to manually fix the floating unit to the bendable connection element 4, e. g. by means of acoustic or visual instructions. The controller may stop the cable reel when the driver is to fix a floating unit. After a confirmation that the floating unit 5 is attached at the first clamping position 20 the control unit 14 unlocks the winch 10 for further unwinding of the bendable connection element 4. In an automatic mode, the control unit 14 triggers the clamping unit 26 of the first floating unit 5 to switch into the fixed state so that the floating unit 5 will be attached at the first clamping position 20 without any manual intervention (see FIG. 13: Step S107). Depending on the speed of unwinding the bendable connection element 4 the control unit 14 may slow down the winch 10 for attaching the floating unit precisely at the corresponding clamping position.

The control unit 14 checks whether there an additional floating units stored on the platform 3 that could be attached to the bendable connection element 4 (see FIG. 13: Step S108). Since the last floating unit (here floating unit 9) hasn't been attached to the bendable connection element 4 the steps S104 to S108 may be repeated by the control unit 14 for further unwinding of the bendable connection element 4 and attaching additional floating units to the bendable connection element 4.

Figure 7C:
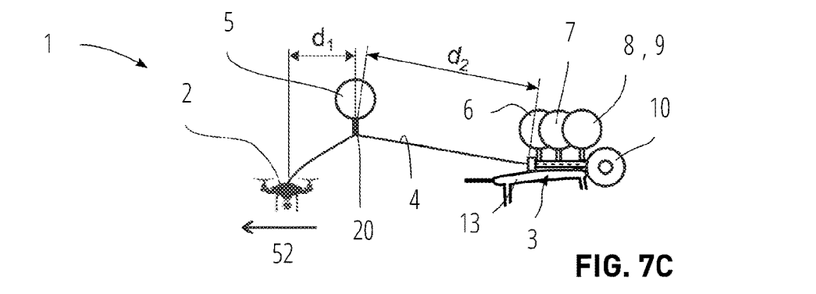
FIG. 7C illustrates the supply system with a floating unit floating in the air.
Figure 7D:
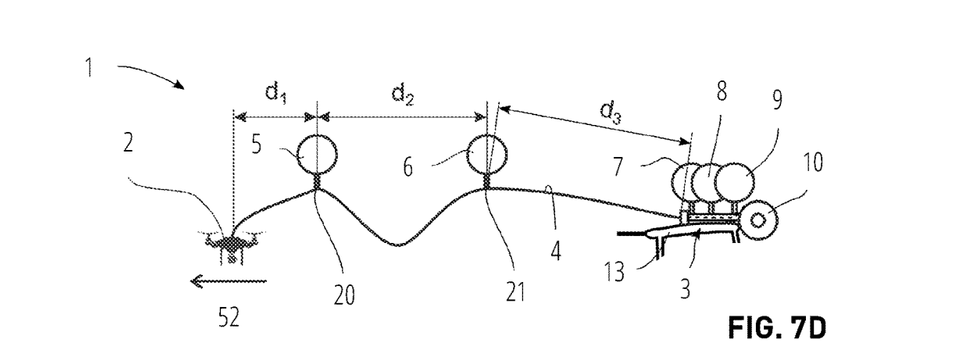
FIG. 7D illustrates the supply system with two floating units floating in the air.

After attaching the first floating unit 5 to the bendable connection element 4 the first vehicle 2 may continue to fly away from the platform 3 in direction 52 as shown in FIG. 7C. The control unit 14 determines continuously the unwound length of the bendable connection element 4 between the first vehicle 2 and the platform 3 as described above. Then, the control unit 14 compares the unwound length of the bendable connection element 4 with the length of the bendable connection element 4 between the first vehicle 2 and the second clamping position 21 (second length) while the bendable connection element 4 is unwound from the winch 10 by the first vehicle 2. When the control unit 14 determines that the length of the unwound portion has reached the length of the bendable connection element 4 between the first vehicle 2 and the second clamping position 21 the control unit 14 initiates an action for attaching the second floating unit 6 at the second clamping position 21 of the bendable connection element 4 analogously to the attaching of the first floating unit 5. I. e., the steps FIG. 7D shows the attaching of the third floating unit 7 at the third clamping position 22 of the bendable connection element 4. The offset OF corresponds to the sum of the distances $d_1$, $d_2$ and $d_3$. Analogous to floating units 5 and 6, the control unit 14 initiates an action for attaching the third floating unit 7 at the third clamping position 22 of the bendable connection element 4 when the length of the unwound portion of the bendable connection element 4 has reached the length of the bendable connection element 4 between the first vehicle 2 and the third clamping position 22.

Figure 7E:
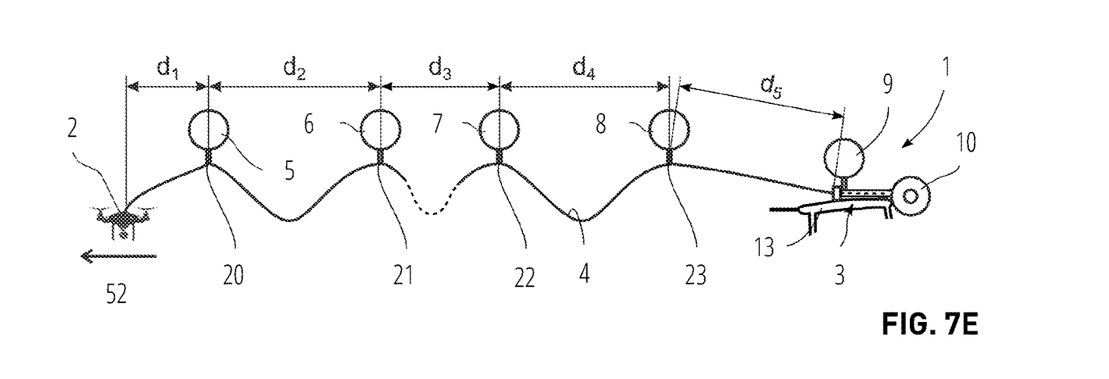
FIG. 7E illustrates the supply system with several floating units floating in the air.

Finally, FIG. 7E shows the attaching of the last stored floating unit 9. The offset OF corresponds to the sum of all distances between the first vehicle 2 and the floating unit 9, here distances $d_1$, $d_2$, $d_3$, $d_4$ and $d_5$. The control unit 14 initiates an action for attaching the floating unit 9 at the clamping position determined for the last floating unit 9 when the length of the unwound portion has reached the length of the bendable connection element 4 between the first vehicle 2 and the clamping position of the floating unit 9. Then, the method comes to an end since no additional floating units are remaining to be attached to the bendable connection element 4 (see FIG. 13: Step S109). As mentioned above, the control unit 14 has predicted a constant floating height for the floating units 5 to 9 irrespective of the exact physical constraints in terms of buoyance force and weight of the bendable connection element 4.

After the first vehicle 2 has finished its operation the bendable connection element 4 may be wound up by the winch 10 to bring all floating units 5 to 9 back to the platform 3 again as depicted in FIG. 7A. Then, the control unit 14 may control the first vehicle 2 to fly back to the platform 3 in a direction opposite to direction 52 and simultaneously control the winch 10 to wind up the bendable connection element 4. While the bendable connection element 4 is wound up one floating unit after another will approach the platform 3. When a floating unit has reached a position at the platform 3, the control unit 14 triggers the clamping unit 26 of that floating unit to switch into the released state. I. e., the distance between the floating unit and the platform has fallen below a threshold to release the floating unit from the bendable connection element 4. Then, the solenoid 38 is energized through the electrical interface 32 or by the battery 39 to retract the piston 37 from the bendable connection element 4 so that the bendable connection element 4 can freely move relative to the clamping unit 26. This enables to string all floating units 5 to 9 close to each other at the platform 3 which allows a storage in a compact space.

The control unit 14 checks whether a portion of the bendable connection element (4) between a previous and a subsequent clamping position (20, 21) is floating below the minimum floating height (24) and/or floating above a maximum floating height (25). If so, the control unit 14 outputs a warning to the operator.

Figure 9:
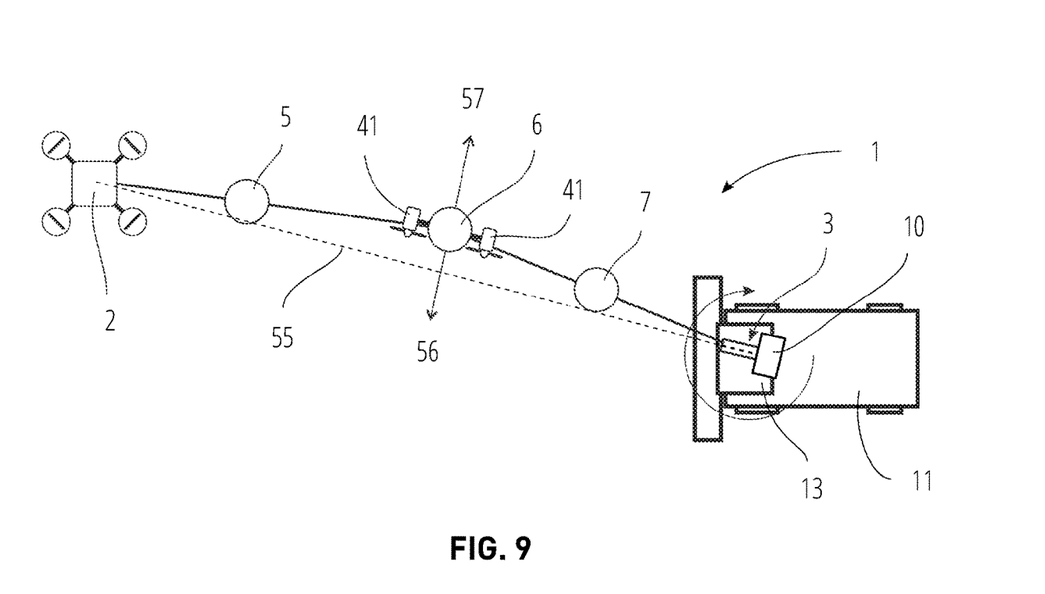
FIG. 9 illustrates a top view of the supply system affected by side winds.

As can be seen in FIG. 5 and FIG. 9, any floating unit 5 to 9 (here: floating unit 6) may optionally comprise at least one rotor unit 41 connected with the envelope 29 to provide a propelled floating unit. The rotor unit 41 may comprise a propeller and may be connected to the power line 33 via a power line 42 so that the rotor unit 41 may be supplied with electrical energy. The control unit 14 may send control signals to the rotor unit 41 for controlling the same through the line 42, too. In case of side winds a floating unit may drift away which may impact the bendable connection element 4 to take shape other than a straight line 55 (see FIG. 9). Such a side drift may be determined by a GNSS sensor or an inertia sensor integrated in the rotor unit 41. The control unit 14 receives the signals and determines control signals for controlling the rotor unit 41 to compensate the side drift. Based on the control signals, the control unit 14 controls the rotor units 41 to move the floating unit 6 in a horizontal direction, e. g. to direction 56 or 57, and to keep the bendable connection element 4 in the straight line 55. Thus, the rotor units 41 provide propulsive drive to counteract the side drift.

Figure 10:
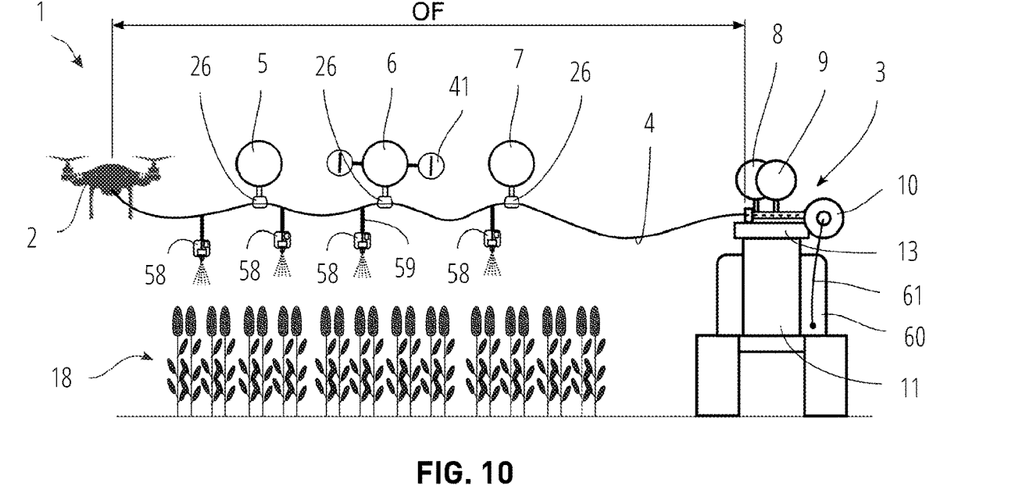
FIG. 10 illustrates a supply system for connecting an aerial vehicle as a first vehicle.

FIG. 10 shows the first vehicle 2 flying over a field of crop (18) connected through the bendable connection element 4 with the platform 3 mounted on the base body 13 of the second vehicle 11 driving parallel to the crop. The bendable connection element 4 is carried by three floating units 5, 6 and 7 floating in the air. The floating units are designed as described above (for example see FIG. 5). The clamping units 26 of the three floating units 5, 6 and 7 are attached to the bendable connection element 4. Floating unit 6 is equipped with two or more rotor units 41.

The second vehicle 11 comprises a reservoir 60 filled with a fluid for treating the crop such as a fertilizer or a pesticide. A supply line 61 connects the reservoir 60 with the platform 3 so that the fluid may be flowed by a hydraulic pump from the reservoir 60 to the bendable connection element 4. The bendable connection element 4 has a tubular shape for transferring the fluid from the reservoir 60 to several applicator units 58 connected each via a supply line 59 with the bendable connection element 4.

While the second vehicle 11 drives along the crop the first vehicle 2 flies parallel to the second vehicle 11 with a constant offset OF to the second vehicle 11. Hence, the applicator units 58 are guided by the bendable connection element 4 above the crop similar to a boom of a boom sprayer wherein the working width corresponds approximately to the offset OF. Since the offset OF may be adjusted by the winch 10 by winding up or unwinding of the bendable connection element 4 the working width is adjustable. So, first vehicle 2 mainly serves the purpose to provide a flexible boom meaning to adjust the working width of the bendable connection element 4 used as boom and to align the bendable connection element 4 mainly perpendicular to the driving direction of the second vehicle 11. Floating unit 6 which is provided with rotor units 41 assists in aligning the bendable connection element 4, e. g. in windy conditions to compensate side drift.

The applicator units 58 serve to apply liquids such as fertilizers or pesticides on crop (18). Therefore, applicator units 58 are fixedly connected with the bendable connection element 4 by a supply line 59 for liquids and electric energy supply.

Figure 11:
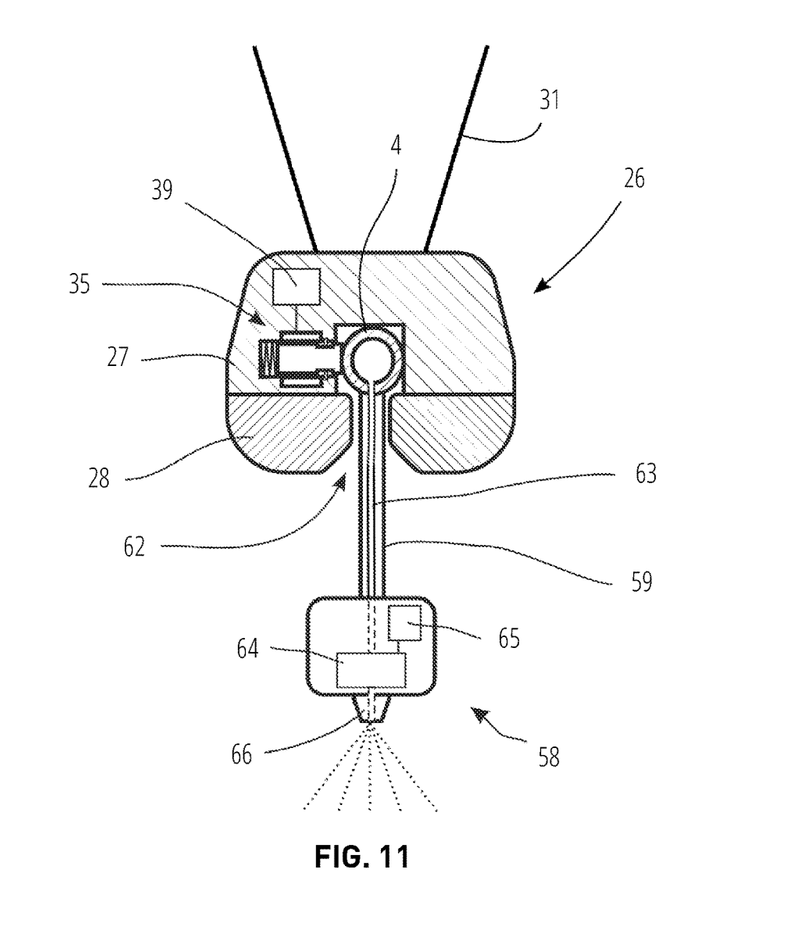
FIG. 11 illustrates a clamping unit and an applicator unit.

FIG. 11 shows one of the clamping units 26 and one of the applicator units 58 of FIG. 10 in more detail. The clamping unit 26 is connected to an envelope 29 via a rope 31. The upper part 27 of the clamping unit 26 houses an actuator 35 for attaching the clamping unit 26 to the bendable connection element 4. The actuator 35 is switchable between the released state and the fixed state as described above and may be energized by the battery 39 which is integrated in the clamping unit 26. The bendable connection element 4 has a tubular shape for transferring the fluid. The applicator unit 58 comprises a valve 64, a microcontroller 65 and a nozzle 66. The applicator unit 58 is connected with the bendable connection element 4 through the supply line 59. The supply line 59 comprises a hose 63 to transfer the fluid from the tubular bendable connection element 4 to the valve 64. The valve 64 is controlled by a microcontroller 65 to control the discharge of the fluid and the spray pattern of the fluid to be applied on the crop. The nozzle 66 is connected with the valve 64 and distributes the fluid on the crop (18).

The lower part 28 of the clamping unit 26 may be screwed to the upper part 27 and retains the bendable connection element 4 within the clamping unit 26. The lower part 28 comprises an aperture 62 through which the supply line 59 is guided to extend in downwards direction for connection with the applicator unit 58. The aperture 62 is designed as a longitudinal passage aligned with the bendable connection element 4 so that the clamping unit 26 can be moved along the bendable connection element 4 without colliding against the supply line 59 or the applicator unit 58 when the actuator 35 is in the released state.

Figure 12:
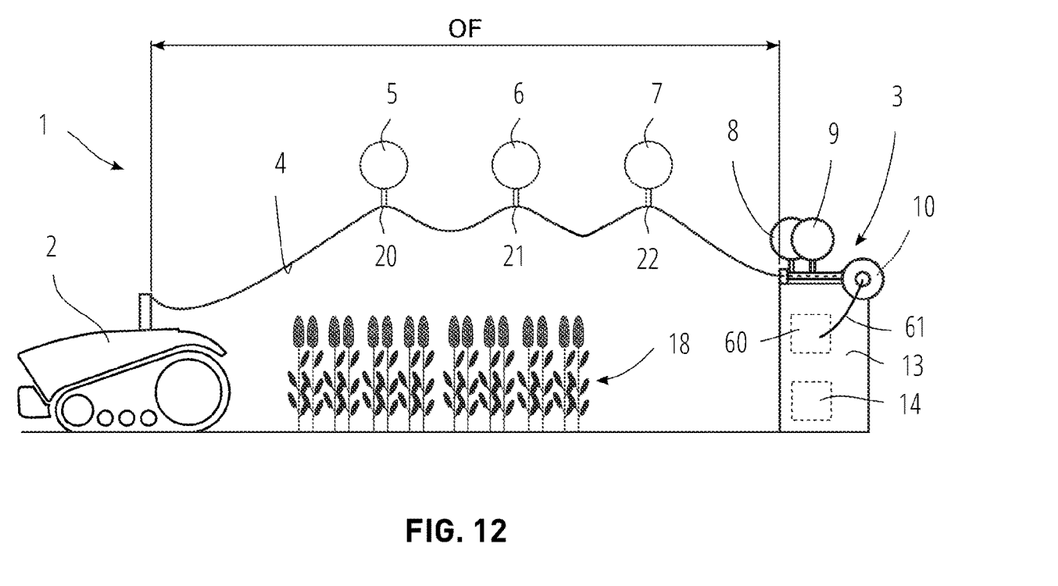
FIG. 12 illustrates a supply system for connecting a ground vehicle as a first vehicle.

FIG. 12 shows analogously to FIG. 2 a supply system 1. The supply system 1 comprises a platform 3, a first vehicle 2, a bendable connection element 4 having one end connected with the first vehicle 2 and another end connected with the platform 3 and at least one floating unit 5, 6, 7, 8 and 9 for lifting the bendable connection element 4, a winch 10 for winding or unwinding of the bendable connection element 4 and a control unit 14. The winch 10 is mounted on a base body 13.

In contrast to FIG. 2, the first vehicle 2 is a ground vehicle such as an agricultural vehicle, for example a self-propelled agricultural robot treating the crop (18) instead of an aerial vehicle. The base body 13 is designed as a static object instead of a second vehicle 11. The control unit 14 is integrated in the base body 13. The reservoir 60 is also integrated in the base body 13. Except for these deviations, the supply system 1 is configured in the same manner as described above. Hence, all the features described above are applicable to the supply system 1 shown in FIG. 12.

All references cited herein are incorporated herein in their entireties. If there is a conflict between definitions herein and in an incorporated reference, the definition herein shall control.

What is claimed is:

1. A supply system for connecting a first vehicle, comprising:
   a platform;
   the first vehicle;
   a bendable connection element having one end connected with the first vehicle and another end connected with the platform, wherein the supply system comprises at least one floating unit for lifting the bendable connection element at least partly over a minimum floating height,
wherein the minimum floating height is higher than a height of an obstacle, and wherein the at least one floating unit is attachable to the bendable connection element distant from the first vehicle; and
a control unit configured to:
determine a first clamping position on the bendable connection element;
to determine an unwound length of the bendable connection element between the first vehicle and the platform; and
to determine a first length of the bendable connection element between the first vehicle and the first clamping position,
wherein a first floating unit is attached to the bendable connection element when the unwound length of the bendable connection element reaches the first length of the bendable connection element.

2. The supply system of claim 1, comprising a sensor for determining a height of an obstacle.

3. The supply system of claim 1, the control unit configured to determine a second clamping position on the bendable connection element; and
to determine an second length of the bendable connection element between the first vehicle and the second clamping position;
wherein a second floating unit is attached to the bendable connection element when the unwound length of the bendable connection element reaches the second length of the bendable connection element.

4. The supply system of claim 3, the control unit configured to determine a slack of the bendable connection element between a previous and a subsequent clamping position.

5. The supply system of claim 4, wherein a length of the bendable connection element between the previous and the subsequent clamping position is short enough that a slack of the bendable connection element between the previous and the subsequent clamping position is liftable by the first and the additional floating unit above the minimum floating height of the bendable connection element.

6. The supply system of claim 3, wherein the second clamping position is determined based on the weight per length of the bendable connection element and the length of the bendable connection element from the first to the second clamping position; wherein the length of the bendable connection element from the first to the second clamping position is long enough that the bendable connection element from the first to the second clamping position is liftable by the first and the second floating unit below a maximum floating height of the bendable connection element.

7. The supply system of claim 3, the control unit configured to determine a third clamping position on the bendable connection element;
wherein the length of the bendable connection element between the first clamping position and the second clamping position is equal to the length of the bendable connection element between the second clamping position and the third clamping position.

8. The supply system of claim 3, the control unit is configured to detect when at least a portion of the bendable connection element between the first and the second clamping position is floating below the minimum floating height and/or floating above a maximum floating height.

9. The supply system of claim 1, wherein the determination of a clamping position is based on the minimum floating height of the bendable connection element, a maximum floating height of the bendable connection element, a maximum floating height of the at least one floating unit, a height of the first vehicle, a height of the platform, a weight force of the bendable connection element, an ambient temperature, a barometric pressure, a weight force of the at least one floating unit or a buoyant force of the at least one floating unit.

10. The supply system of claim 1, comprising a winch for winding or unwinding of the bendable connection element; wherein the control unit is configured to:
control the winch; and
to determine a clamping position for attaching the at least one floating unit to the bendable connection element,
wherein the control unit stops an unwinding of the bendable connection element when the clamping position is reached.

11. The supply system of claim 1, the at least one floating unit is detached from the bendable connection element when a distance between the at least one floating unit and the platform falls below a threshold.

12. The supply system of claim 1, the at least one floating unit comprising a clamping unit switchable between a fixed state for attaching the at least one floating unit to the bendable connection element and a released state for detaching the at least one floating unit from the bendable connection element.

13. The supply system of claim 12, wherein the clamping unit comprises an actuator configured to switch into the released state when the actuator is energized with electrical energy and to switch into the fixed state when the actuator is deenergized.

14. The supply system of claim 13, the clamping unit comprising a roller in contact with the bendable connection element, wherein the roller is rotatably drivable by the actuator for moving the clamping unit along the bendable connection element.

15. The supply system of claim 1, comprising a second vehicle wherein the platform is mounted on a base body or any other part of the second vehicle.

16. The supply system of claim 1, wherein the at least one floating unit comprises a rotor unit for positioning a portion of the bendable connection element located between the first vehicle and the platform.

17. A method for attaching a floating unit to a bendable connection element connected with a first vehicle comprising the steps:
determining a buoyant force of a floating unit;
determining a clamping position on the bendable connection element;
determining an unwound length of the bendable connection element; determining a length between the first vehicle and the clamping position;
detecting when the unwound length of the bendable connection element reaches the length between the first vehicle and the clamping position; and
attaching the floating unit at the clamping position when the unwound length of the bendable connection element has reached the length between the first vehicle and the clamping position.

* * * * *